United States Patent [19]

Kurosu et al.

[11] Patent Number: 4,683,540
[45] Date of Patent: Jul. 28, 1987

[54] METHOD AND APPARATUS FOR ORDERING A WORKING OPERATION IN AN ASSEMBLY LINE

[75] Inventors: Noriaki Kurosu, Aichi; Masanori Ohmae; Michiaki Kashiwa, both of Toyota, all of Japan

[73] Assignee: Toyota Jidosha Kabushiki Kaisha, Japan

[21] Appl. No.: 645,759

[22] Filed: Aug. 30, 1984

[30] Foreign Application Priority Data

Sep. 9, 1983 [JP] Japan ................. 58-167291

[51] Int. Cl.⁴ ............. G06F 15/46; G06F 15/226; B65G 43/00; B07C 5/00
[52] U.S. Cl. .................. 364/468; 364/403; 364/200; 364/478; 414/136; 209/552
[58] Field of Search ........... 364/200, 300, 900, 403, 364/468, 424, 425, 478; 209/552, 546, 576, 583; 414/136

[56] References Cited

U.S. PATENT DOCUMENTS

| | | | |
|---|---|---|---|
| 3,639,728 | 2/1972 | Helfand et al. | 364/478 |
| 3,688,087 | 8/1972 | Howard et al. | 364/403 |
| 4,058,217 | 11/1977 | Vaughan et al. | 414/136 X |
| 4,312,623 | 1/1982 | Allred et al. | 414/136 X |
| 4,332,012 | 5/1982 | Sekine et al. | 364/468 |
| 4,408,291 | 10/1983 | Gunberg et al. | 364/468 |
| 4,459,663 | 7/1984 | Dye | 364/200 |
| 4,509,123 | 4/1985 | Vereen | 364/300 |
| 4,514,815 | 4/1985 | Anderson | 364/478 |
| 4,561,060 | 12/1985 | Hemond | 364/468 |
| 4,576,370 | 3/1986 | Jackson | 364/478 X |

*Primary Examiner*—Jerry Smith
*Assistant Examiner*—Jon D. Grossman
*Attorney, Agent, or Firm*—Parkhurst & Oliff

[57] ABSTRACT

A method and an apparatus for ordering a working operation in an assembly line having sublines in which parts for different models are assembled. All of the parts in the assembly line have serial numbers. The parts are allocated with a working code which comprises a sub-serial number, a line code and a model code. The sub-serial numbers are successive numbers within each sub-line. The line code indicate the sub-line in which the part is manufactured, and the model code indicates the working operation to be performed in each line according to the model. The working code is transmitted into a working order instructing apparatus by which the working code is instructed. When the sub-serial numbers of the working code are consecutive in the sub-line, it is determined that the working operation designated by the working code should be performed.

5 Claims, 9 Drawing Figures

METHOD AND APPARATUS FOR ORDERING A WORKING OPERATION IN AN ASSEMBLY LINE

BACKGROUND OF THE INVENTION

The present invention relates to a method and an apparatus for ordering a working operation to workers in an assembling line, and more particularly to a method and an apparatus for ordering a working operation in an automobile assembling line in which parts different models are assembled.

In manufacturing parts such as automobiles, products for different models are sometimes manufactured in a common assembly line. For example, in an automobile body assembly line, different kinds of automobiles whose models and grades are determined by a production plan, are generally assembled in a common line. The production plan determines the number of automobiles to be manufactured, according to the consumers' orders. In such as assembly line, the working order which indicates the workers' job in a line, has generally been determined by two methods. The first method involves preparing a working order sheet by a production plan and distributing the working order sheet to workers. Workers determine kind of the automobile to be manufactured from the working order sheet. The second method involves memorizing the working order beforehand in a shift register, and the working order by an indicator as each automobile body is transferred.

However, according to the above-described first method, after workers confirm the transferred automobile bodies by the working order sheet, worders have to assemble a predetermined part onto an automobile or machine automobile bodies. Hence, it is troublesome for workers to confirm the transferred automobile bodies by the working order sheet. This also can be disadvantageous because workers can erroneously read the working order sheet, thereby manufacturing a defective automobile body which is different from the body designated on the working order sheet.

On the other hand, according to the above-described second method employing a shift register, a working order is indicated in every transferred automobile body, and workers assemble a predetermined part or machine a transferred automobile body according to the working operation instructed by the indicator. Hence, mistaken working operations are considerably reduced. However, the disadvantage of the production of automobile bodies, which are different from the body indicated by the indicator remains, because of the mistakes by workers or mistaken communication between the indicator and other devices. Mistakes by workers occurs when, for example, a worker presses a push button twice in a short time. In this case, the push button outputs only one shift pulse even when the push button is pressed twice. In the case that a shift pulse is issued in response to a transfer of an automobile body, the mistaken communication between devices occurs when a transfer machine, is not synchronized with the shift register, or when a relay switch generates a chattering. Based upon the workers' mistaken operation or the mistaken communication between devices, a working order which is different from the working order memorized in the shift register, is sometimes instructed by the indicator. For example, as shown in FIG. 5(A), when working order data is memorized in a shift register 10 in an order such as "a", "a", "b", "a", "b", and "b", the shift register 10 issues an indicator signal "IS" to an indication 12 in the order memorized in the shift register 10 upon the consecutive supply of the shift pulse "SP". That is, when the shift pulses $SP_1$, $SP_2$, . . . , $SP_5$ are consecutively supplied into the shift register 10, as shown in FIG. 5(B), the shift register 10 outputs the indication signals into the indicator 12, which designates the data memorized in the shift register 10, "a", "a", . . . , and "b". The indicator 12 is designed to consecutively indicate the working order "a'", "a'", . . . , "b'" corresponding to the data "a", "a", . . . , "b", respectively. However, as shown in FIG. 5(C), if the shift pulses $SP_1$ and $SP_2$ are supplied into the shift register 10 in a short time for reasons such as a chattering at a relay switch, the shift register 10 consecutively outputs the indication signal "IS" corresponding to the data "a", but the indicator 12 cannot reply to the second shift pulse $SP_2$ because of the short time interval between the first and second signals. Hence, when the next shift pulse $SP_3$ is supplied to the indicator 12, the indicator 12 indicates the working order "b'" corresponding to the data "b". Thus, the data "a" memorized in the shift register 10 as the second order is not indicated by the indicator 12. As workers work according to the working order indicated by the indicator 12, workers have no doubt as to the indicated order even if a mistaken indication is indicated by the indicator 12. Hence, workers cannot easily find that the indication is mistaken, thereby causing delay in the discovery of the problem. Further, if an indication mistake is made once, defective products which are different from the predetermined body by one automobile are manufactured, thus causing a number of defective products.

The above-described second method is further explained in detail by an example of an assembly which assembles two kinds of automobile model bodies "a" and "b". In FIG. 6, sub-lines 14 and 16 are the lines which manufacture an engine compartment 18 and a front floor 20 for two models "a" and "b" as shown in FIG. 7. The manufactured engine compartment 18 and front floor 20 are combined at a station 22 as shown in FIG. 6, thereby forming an under front 24. Subsequently, final assembly is made in a final line 26. Working order instructing apparatuses 28 and 30, which include the shift registers 10 and the indicators 12 therein, are provided at the head portions of the sub-lines 14 and 16, respectively. The working order instructing apparatuses 28 and 30 instruct the model of automobiles to be manufactured in the sub-lines 14 and 16, respectively. The shift registers 10 of the working order instructing apparatuses 28 and 30 memorize the same data as those shown in FIG. 5(A), respectively. "a model of an automobile" and "b model of an automobile" are herein referred to as "a" and "b", hereunder respectively.

In the parallel sub-lines 14 and 16, engine compartments 18 and front floors 20, both of which are employed in the same model of automobile, are manufactured at the same time. The engine compartments 18 and front floors 20, manufactured in the sub-lines 14 and 16, are designed to be assembled at the station 22. If the mistaken indication as shown in FIG. 5(C) occurs, the sub-line 16 does not manufacture the front floor 20 for the "a" model automobile which is to be manufactured by the second order. Hence, the engine compartments 18 and front floors 20, which are subsequently manufactured in the sub-lines 14 and 16 respectively, do not coincide with those determined by the production plan. As a result, at the station 22, an engine compartment 18 for use of "a" model is assembled into a front floor 20 for use of "b" model, or an engine compartment 18 for use of "b" is assembled into a front floor for use of "a" model. Thus, many defective parts are manufactured.

Moreover, if the defective parts caused by the mistaken instruction of the working order instructing apparatuses or by the mistaken working operation, are discovered on the way assembly line, all that is known is that the defective assembly is different from the automobile model of the production plan. Hence, it is troublesome to identify the mistaken working operation or the mistaken assembled parts. Thus, a lot of time is required to solve the problems.

SUMMARY OF THE INVENTION

The present invention was developed, in view of the foregoing background and to overcome the foregoing drawbacks. It is accordingly an object of this invention to provide a method and an apparatus for ordering a working operation in an assembly line which prevents mistaken working order.

To attain the above objects, a method and an apparatus according to the present invention are provided which number all of the parts in a whole assembly line with consecutive serial numbers. The assembly line has a sub-line in which parts are assembled according to a production plan. Further, a working signal having a sub-serial number, which is a successive number within each sub-line, and a working code, which indicates the working operation to be made in each step are provided. This working signal is memorized in a predetermined portion. The memorized working signal is transmitted into a working order instructing apparatus, by which the working signal is instructed. When the sub serial number of the newly transferred part is successive within the sub-line compared with that of the previously transferred part in the same sub-line, a working order is issued as designated by the working code. On the other hand, if the sub-serial number is not successive, it is instructed that a mistaken assembly has occurred.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
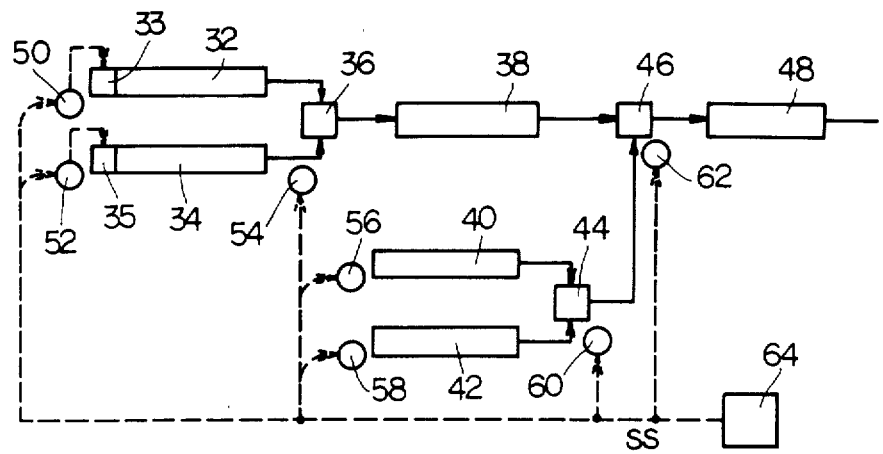
FIG. 1 is a general view illustrating an automobile assembly line in which the present invention is applied.
Figure 7:
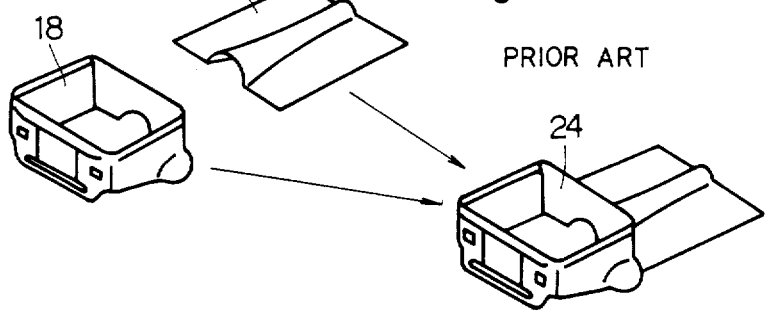
FIG. 7 is a perspective view illustrating a product which is manufactured in the automobile body assembly line shown in FIG. 6.

FIG. 1 illustrates an automobile assembly line in which different kinds of automobile models are manufactured. The present embodiment of the invention, is designed to manufacture six different automobile models, such as "a", "b", "c", "d", "e" and "f". In FIG. 1, the numerals 32 and 34 designate sub-lines in which the engine compartment 18 as shown in FIG. 7 are assembled. The sub-line 32 is designed to assemble the engine compartment 18 corresponding to three kinds of automobile models such as "a", "b" and "c". The other sub-line 34 is designed to assemble the engine compartment 18 corresponding to three kinds of automobile models such as "d", "e", and "f". Automatic printing devices 33 and 35, which print serial numbers on a predetermined portion of the engine compartment 18, are provided at the head portions of the sub-lines 32 and 34, respectively. A station 36 is provided at the rear part of the sub-lines 32 and 34. The engine compartment 18 which is assembled in the sub-line 32 or 34, is transferred from the sub-line 32 or 34 in the predetermined order, and is further transferred through the station 36 to a line 38.

A sub-line 40 assembles a front floor 20 corresponding to the three kinds of automobile models "a", "b", and "c". Further, a sub-line 42 assembles a front floor 20 corresponding to the three kinds of automobile models "d", "e" and "f". The assembled front floors 20 are in a row in a predetermined order at a station 44, and are transferred to a station 46. In the station 46, the engine compartment 18, which is spot welded in the line 38, is assembled with the front floor 20 transferred from the station 44, to provide an under front 24. The assembled under front 24 is transferred to a final line 48, wherein a predetermined assembly working operation corresponding to six kinds of under front 24 is made. Since there are great structural differences between the engine compartments 18 and the front floor 20 in the models "a", "b", "c" and the models "d", "e", "f" it is difficult to manufacture the engine compartments and the front floors of these models in the same line. Hence, these parts are assembled in two sub-lines 32, 34 and 40, 42.

Working order instructing apparatuses 50, 52, 54, 56, 58, 60 and 62 are provided at each line or station where different kinds of working operations are made according to the automobile model. The working order instructing apparatuses 50–62 are designed to receive the common working operation data "SS" outputted from a computer 64 and memorize the necessary portion among the outputted working operation in the inputted order, and further output some data if necessary. Thus, the working order instructing apparatuses direct the working operation to be made in each line or station.

In the whole assembly line, all of the parts are numbered with consecutive four digit serial numbers which increase by one. The working order is controlled by this serial number. The computer 64 prepares working signals comprising the serial number and the working code. The working signals indicate the working operation to be performed on the numbered part in each line or station. Working signals "SS", designating the working data, are inputted into the working order instructing apparatuses 50-62. The inputted working signals "SS" are independently processed at each of the working order instructing apparatus 50-62, and the working order is performed by each working order instructing apparatus. The structure and function of the working order instructing apparatuses 50-62 are similar. Hence, the working order instructing apparatus 50 is explained hereunder as one example, and the working order instructing apparatus 52-62 is explained only as to the different structure and function from those of the apparatus 50.

Figure 2:
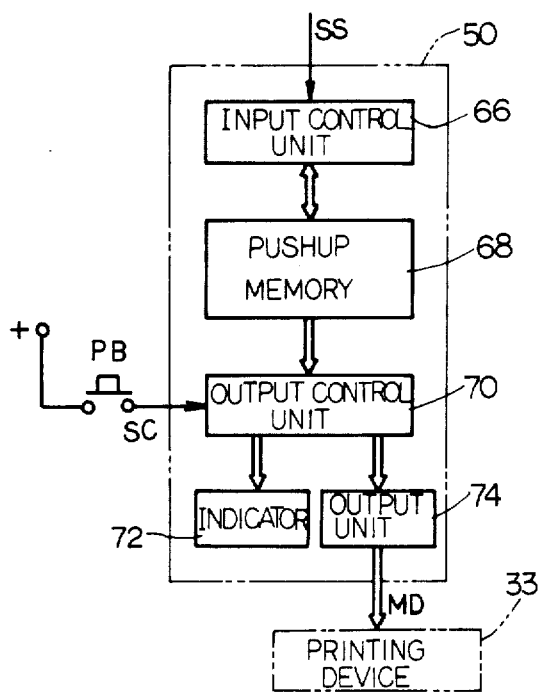
FIG. 2 is a block diagram of a working order instructing apparatus which is installed in the automobile assembly line shown in FIG. 1.

As shown in FIG. 2, the working order instructing apparatus 50 includes an input control unit 66, a pushup memory 68, an output control unit 70, an indicator 72, and an output unit 74, therein. The input control unit 66 receives the working signal "SS" which is outputted from the computer 64, and processes the working signal "SS" into a form which is suitable for the pushup memory 68. The processed form is inputted into the pushup memory 68. The pushup memory 68 is constructed by, for example, hard ware such as Western Digital Company's LSI FR1502E or a random access memory (RAM) of a micro computer. The pushup memory 68 memorizes the working signals in the order in which the signals are inputted therein. The output control unit 70 outputs the working signal memorized in the pushup memory 68 whenever an output signal "SC" is supplied into the output control unit 70 upon the press of a push button "PB". The outputted working signal is supplied into the indicator 72, and the output unit 74.

The working signals, which are memorized in the pushup memory 68, are shown in the following TABLE I.

TABLE I

| | | WORKING SIGNAL | | |
| | | | WORKING CODE | |
| MEMORY ADDRESS | SERIAL NUMBER | SUB-SERIAL NUMBER | LINE CODE | AUTO-MOBILE MODEL CODE |
| --- | --- | --- | --- | --- |
| 8 | 028 | 4 | [2] | [5] |
| 7 | 027 | 4 | [1] | [2] |
| 6 | 026 | 3 | [2] | [6] |
| 5 | 025 | 2 | [2] | [4] |
| 4 | 024 | 3 | [1] | [2] |
| 3 | 023 | 1 | [2] | [4] |
| 2 | 022 | 2 | [1] | [3] |
| 1 | 021 | 1 | [1] | [1] |

As is apparent from TABLE I, the working signals, which are memorized in the pushup memory 68, include serial numbers and sub serial numbers. The serial numbers are consecutive and are allocated to all parts of the automobile body being manufactured in the assembly line. The sub-serial number is a serial number which is consecutive in only a sub-line and is allocated to the parts to be manufactured in the sub-lines. According to the present embodiment, only the lower three figures of the serial number and the lowest figure of the sub-serial number are memorized in the pushup memory 68.

Further, the working signal includes a working code which comprises a line code and an automobile model code, in addition to the sub-serial number. The line code designates a sub-line where the working should be performed. The line code [1] designates the sub-line 32, and the line code [2] designates the sub-line 34. The automobile model code designates a model to be assembled. The automobile model code [1], [2], . . . , and [6] designate the automobile models "a", "b", . . . and, "f", respectively. Hence, if the working code comprises the line code [1] and the automobile model [1] memorized in a memory address 1 of the pushup memory 68, this designates a working procedure such as, for example, an engine compartment 18 for use of the automobile model "a" should be assembled in the sub-line 32. In the memory address 3 of the pushup memory 68, the working code includes the line code [2] which designates the sub-line 34. Hence, the working code memorized in the memory address 3 indicates that no working procedure should be made in the sub-line 32.

Figure 3:
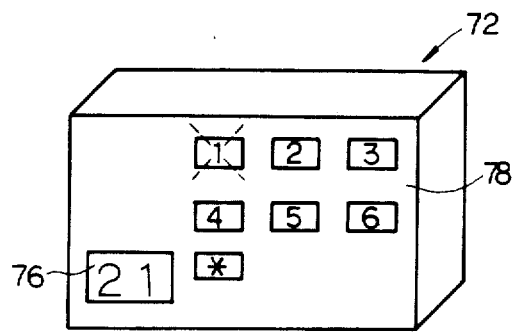
FIG. 3 is a perspective view of an indicator which is employed in the working order instructing apparatus shown in FIG. 2.

The indicator 72, as shown in FIG. 3, includes an indicating window 76 which illustrates the lower two figures of the serial number by the number, and an indicating panel 78 which illustrates the line code. The indicating panel 78 is provided with lamps corresponding to the numbers 1-6, which designate the automobile model code. If the lamp corresponding to a mark "*" turns on, this indicates that no should be performed in its line. When the working signal memorized in the memory address 1 is outputted from the pushup memory 68 upon the press of the push button "PB", the lamp designating the automobile model code [1] turns on and the serial number 21 is indicated in the indicating window 76. When the working signal memorized in the memory address 2 is outputted from the pushup memory 68, the lamp designating the automobile model code [3] turns on and further the serial number 22 is indicated in the window 76. Moreover, when the working signal memorized in the memory address 3 is outputted from the pushup memory 68, the window 76 indicates the serial number 23, but the lamps designating the automobile model code do not turn on. The lamp designating the mark "*" turns on. The indicator 72 of the working order instructing apparatus 50, which is provided in the sub-line 32, does not turn the lamps designating the automobile model code [4], [5] nor [6] on, and but instead turns the lamp designating the mark "*" on. Thus, in the sub-line 32, the engine compartments 18 for the automobile models corresponding to the automobile model code [4], [5] and [6] are not manufactured. Instead, engine compartments 18 for the automobile model code [4], [5] and [6] are manufactured in the other sub-line 34.

Hence, a worker confirms whether or not the numbers indicated by the window 76 upon the press of the push button "PB" are successive. If the indicated numbers are not successive, the worker determines that the indicated working order is erroneous, thereby taking the necessary procedure. On the other hand, if the indicated numbers are successive, the worker reads which lamp is turned on in the indicating panel 78. When a lamp designating the automobile model code [1], [2] and [3] is turned on, the engine compartments 18, for the automobile model indicated by the lamp which is on are supplied to the sub-line 32, wherein the necessary assembly work is performed. If the lamp designating the mark "*" turns on, the worker does not need to perform any work. Hence, the worker presses the push button "PB" down again and requires the next working signal. The worker confirms that the numbers indicated in the window 76 increase one by one, and repeatedly presses the push button until one of lamps designating the automobile model code [1], [2] and [3] turns on. In the sub-line 32, the working code, which comprises the line code and the automobile model code, indicates which automobile model among "a", "b" and "c" should be assembled with the engine compartments 18. Further, the working code indicates that a worker should require the next working signal upon the press of the push button "PB" provided that the engine compartment of the automobile body, is not required to be assembled in the sub-line 32.

Figure 4:
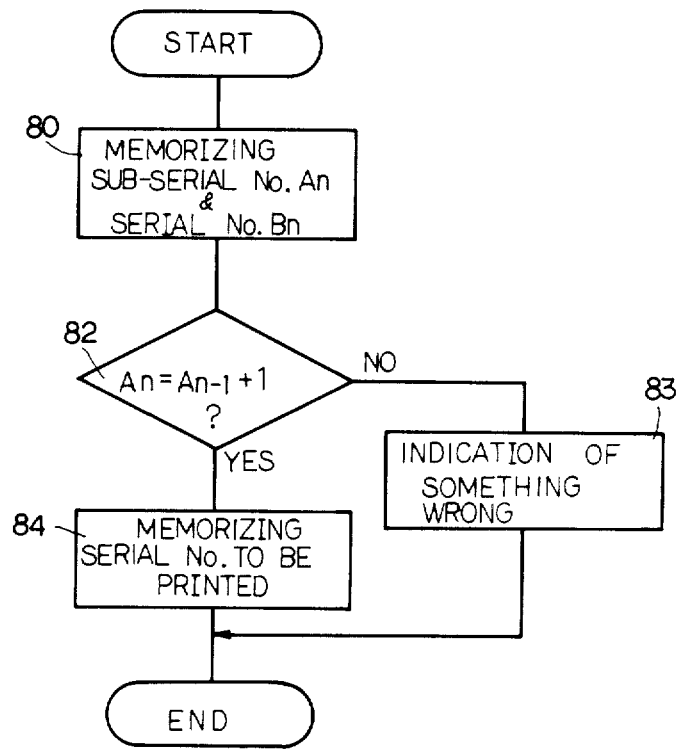
FIG. 4 is a flow chart illustrating a program which determines whether or not the sub-serial numbers of assembly are consecutive.
Figure 5:
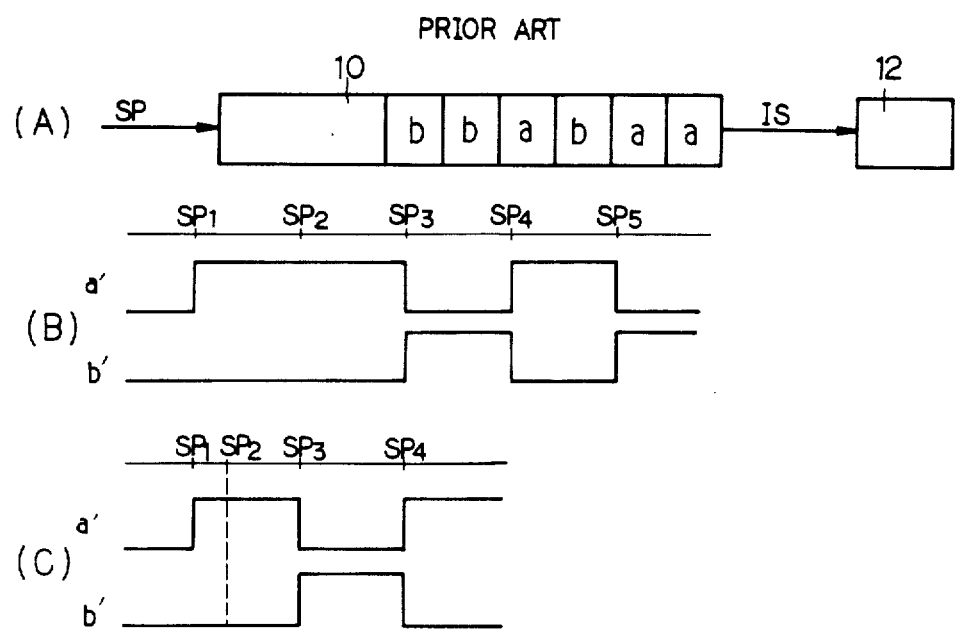
FIGS. 5(A)–5(C) represent a diagram which illustrates a mistaken working operation according to a prior working order instructing apparatus.
Figure 6:
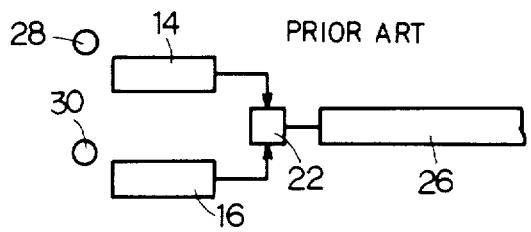
FIG. 6 is a general view illustrating an automobile assembly line in which a prior working order instructing apparatus is installed.

When the line code in the working signal outputted from the pushup memory 68 is [1], the output control unit 70 supplies the serial number and the sub-serial number into the output unit 74. The output unit 74 converts the output from the output control unit 70 into an electrical signal, and this electrical signal is outputted to a control unit of the automatic printing device 33. The control unit of the automatic printing device 33 determines whether or not the sub-serial number contained in the output signal from the output unit 74 is in proper sequence with the previous sub-serial number. This determination is explained in conjunction with the flow chart shown in FIG. 4.

In step 80, the sub-serial number $A_n$ and the serial number $B_n$, which are contained in the working signals, are memorized in the predetermined position of a working memory. The program proceeds to step 82, wherein it is determined if sub-serial number $A_n$ is equal to the previous sub-serial number $A_{n-1}$ plus 1. If the sub serial number $A_n$ is not equal to $A_{n-1}$ plus 1, the working signal is erroneous, and the program proceeds to step 83. Step 83 indicates that something is wrong. Based upon this indication, workers take the necessary procedure to correct the problem. On the other hand, if the sub serial member $A_n$ is equal to $A_{n-1}$ plus 1, the working signal is correct, and the serial number $B_n$ is memorized in the different position of the working memory. When the engine compartment 18 is transferred into the predetermined position, the automatic printing device 33 is designed to print the memorized serial number $B_n$ onto the portion of the engine compartment 18.

In the sub-line 32, sub-serial numbers are consecutively assigned as the serial numbers are in the whole assembly line. The serial number, which is printed onto the portion of the engine compartment 18 by the automatic printing device 33, functions as a working code.

The working order instructing apparatus 52 is constructed similarly to the apparatus 50. In this working order instructing apparatus 52, one of lamps, which designate the working code [4], [5] and [6] corresponding to the automobile models "d", "e" and "f", turns on. If the pushup memory 68 outputs the working signal containing the automobile model code corresponding to the automobile model "a", "b" and "c", the lamp designating the mark "*" turns on in the working order instructing apparatus 52.

The working order instructing apparatuses 56 and 58, which are provided at the sub-lines 40 and 42 respectively, are similar in construction to the apparatuses 50 and 52. In the sub-lines 40 and 42, an automatic working device such as the automatic printing devices 33 and 35 is not provided. Hence, the output unit 74 is not employed. In the sub-lines 40 and 42, workers supply the parts of front floors 20 corresponding to the automobile model which is indicated by the turned lamp of the indicating panel 78 in the indicator 72, and further workers perform the necessary assembly operation. Further, workers manually write the lower two figures of the serial number indicated in the window 76 onto the appropriate portions of the front floors 20.

The working order instructing apparatus 54, which is provided at the position close to the station 36, is similar in construction to the apparatus 50. Hence, a worker requests the working signal by pressing a push button, and confirms that the serial number indicated in the window 76 is in sequence. If one of the lamps designating the automobile model code [1], [2] and [3] turns on, the worker removes an engine compartment 18 from the sub-line 32. If one of the lamps designating the automobile model code [4], [5] and [6] turns on, the worker removes an engine compartment from the sub-line 34. These engine compartments 18 are further supplied to the line 38. In these circumstances, if workers confirm that the automobile model code of the engine compartments 18 taken out from the sub-lines 32 or 34 is as same as that indicated on the indicating panel 78, mistaken assembly can be obviated. Further, even if mistaken assembly might occur, each assembly is designated by the serial number, and hence it is easy to determine where the mistake in assembly occurred. In the working order instructing apparatus 54, the lamp indicating the mark "*" does not turn on.

As apparent from the above explanation, the working signals which are memorized in the pushup memory 68 provided within the working order instructing apparatus, are the same as those memorized in the working order instructing apparatus 50 which is shown in the above TABLE I. However, the working procedure of the apparatus 54, which is designated by the code and numbers, is different from that of the apparatus 50. In the working order instructing apparatus 54, the line code and the sub-serial number do not mean anything, and the automobile model code functions as a working code which designates the engine compartments 18 to be removes from the sub-line 32 or 34. The workers can confirm whether or not the serial number typed on the engine compartment 18 is the same as that indicated in the window 76. The construction and operation of the working order instructing apparatus 60 provided at the position close to the station 44 are as same as those of the apparatus 50.

The working order instructing apparatus 62, which is provided at the position closest to the station 46, is similar in construction to the apparatus 54 and 60. In the station 46, workers assemble the engine compartments 18, transferred from the line 38, with the front floors 20, transferred from the station 44, one by one. As the serial number is typed or written on the engine compartment 18 and the front floor 20, workers assemble them while the workers confirm whether the serial number on the engine compartment 18 is as same as that on the front floor 20. It is not always necessary to provide the working order instructing appartus 62 at the position close to the station 46. If the working order instructing apparatus 62 is provided, the workers can determine whether or not the serial number indicated by the indicator 72 of the apparatus 62 is the same as the serial numbers of the engine compartment 18 and the front floor 20. Further, the workers can confirm whether or not the automobile model code indicated by the panel 78 is the same as those of the actually transferred engine compartment 18 and front floor 20. Hence, a mistake in assembly can be determined before the engine compartment is erroneously assembled with the front floor or a different automobile model. The pushup memory 62, within the working order instructing apparatus 62, memorizes the data in TABLE I. The line code and the sub-serial number function as nothing. The serial number functions as a working code by which the workers confirm whether or not the serial number typed or written on the engine compartment 18 and the front floor 20 is the same as that indicated in the window 76 of the indicator 72. Further, the automobile model code functions as a working code by which the workers confirm whether or not the engine compartment 18 and the front floor 20 are parts of the automobile model corresponding to the automobile model code.

Next, when a mistake in assembly occurs in the automobile body assembly line, the role of the serial number is explained hereunder. For example, when the engine compartment 18 is erroneously assembled in the sub-line 32, heretofore only the automobile model of the engine compartment 18 is clarified, and hence it has been difficult to designate the front floor 20 or the under front 24. However, according to the present embodiment, it is easy to identify the front floor 20 or the under front 24 corresponding to the mistakenly assembled engine compartment 18 by the serial number. The workers can easily remove the mistakenly assembled product from the assembly line. When an automatic working device is employed in the assembly line, such an order is outputted as the working operation corresponding to the removed product should not be made. Or, the automatic working device is temporarily converted to a manual device, and the working signal corresponding to the removed product is skipped. Thereafter, the device can work according to the next working signal.

According to the present embodiment, the pushup memory 68 of the working order instructing apparatuses 50–62 memorize the working signals outputted from the unitary computer 64, but it is possible for workers to memorize the working signals in the pushup memory 68 by such a method as the workers manually memorize the working signals based upon working order tables which are distributed by each working order instructing apparatus.

Further, according to the present embodiment, the working order instructing apparatuses 50, 52, 54, 56, 58, 60 and 62 are designed to have the same construction, and they can be widely employed in the different kinds of steps. If a working order instructing apparatus is provided which is exclusive in each step, the memory capacity can be small. As an example, the working order instructing apparatus 54 is explained. In this case, the working operation is performed by an automatic working apparatus. The input control unit 66 of the working order instructing apparatus 54 is designed to memorize only the serial number and the line code among the working signals supplied from the computer 64 into the pushup memory 68, as shown the following TABLE II.

TABLE II

| MEMORY ADDRESS | WORKING SERIAL NUMBER | SIGNAL LINE CODE |
|---|---|---|
| . | . | . |
| . | . | . |
| . | . | . |
| 8 | 028 | [2] |
| 7 | 027 | [1] |
| 6 | 026 | [2] |
| 5 | 025 | [2] |
| 4 | 024 | [1] |
| 3 | 023 | [2] |
| 2 | 022 | [1] |
| 1 | 021 | [1] |

Based upon the output signals which are automatically outputted from the automatic device, the output control unit 70 outputs a pair of working signals into the pushup memory 68. The output unit 74 converts the outputted signal including the serial number and the line code into the electrical signals. These converted electrical signals are inputted into the automatic working apparatus. This automatic working apparatus determines whether or not the serial numbers among the working signals supplied as the electrical signal is successive. If it is confirmed that the serial numbers are successive, an engine compartment 18 is taken out one by one from the sub line 32 or 34 which is designated by the line code [1] or [2], and the engine compartment 18 is transferred into the line 38.

Further, according to the above embodiment, only the serial number is designed to be illustrated, but it is possible that the indicator illustrates the sub-serial number instead of the serial number. Further, it is determined by the workers or the control unit of the automatic working order apparatus whether or not the serial number is successive, but it is possible that the working order instructing apparatus is designed to function to determine whether or not the serial number is sequential. In this case, it is not necessary for the workers to pay attention to the matter whether or not the serial number is successive. Further, the automatic working order apparatus does not need to include the determination function therein.

Further, according to the above embodiment, the lines, in which the engine compartments 18 and the front floors 20 are assembled, are separated into the multiple sub-lines such as 32, 34 or 40, 42, from the limitation of the construction of the engine compartment 18 and the front floor 20. The line may be separated into the sub-lines even if there is no limitation as to the construction of the engine compartment and the front floor. The present invention can be applied into such a line.

While the present invention has been described in its preferred embodiments, it is to be understood that the invention is not limited thereto, and may be otherwise embodied within the scope of the following claims.

What is claimed is:

1. A vehicle assembling system comprising:

a computer means including a means for outputting signals indicative of sub-serial numbers, main-serial numbers and model numbers, each one of the main-serial numbers corresponding to one of the sub-serial numbers and one of the model numbers;

a first indicator means connected to said computer means, the first indicator means receiving said signals outputted from the computer means, the first indicator means including a memory, a first display means and an output switch means, the memory including a means for memorizing the signals from the computer means in an order in which the signals are received, the output switch means outputting the memorized signals from the first indicator means in the order in which the signals are received, the first indicator means indicating one of said main-serial numbers and one of said model numbers on the first display means;

a second indicator means connected to said computer means, the second indicator means receiving said signals from the computer means, the second indicator means including a memory, a second display means and an output switch means, the memory memorizing the signals from the computer means in the order in which the signals are received, the output switch means outputting the memorized signals from the second indicator means in the order in which the signals are received, the second indicator means indicating one of the main-serial numbers and one of the model numbers on the second display means;

a first subline for provisionally assembling a first sub-assembly comprising a plurality of parts for a first model;

a second subline for provisionally assembling a first sub-assembly comprising a plurality of parts for a second model;

a first numbering means for numbering a first part of the first sub-assembly for the first model with the main-serial number indicated by the first indicator means and the corresponding sub-serial number, whereby when the first display means indicates both the main-serial number and the model number, the first numbering means numbers said first part with the indicated main-serial number and the corresponding sub-serial number;

a second numbering means for numbering a first part of the first sub-assembly for the second model with the main-serial number indicated by the second indicator means and the corresponding sub-serial number, the main-serial number of the second indicator means being different from the main-serial number of the first indicator means, whereby when the second indicator means indicates both the main-serial number and the model number, the second numbering means numbers the first part of the first sub-assembly for the second model with the indicated main-serial number and corresponding sub-serial number;

a third indicator means connected to the computer means, the third indicator means receiving said signals from the computer means, the third indicator means including a memory, a third display means and an output switch means, the memory memorizing the signals from the computer means in the order in which the signals are received, the output switch means outputting the memorized signals from the third indicator means in the order in which the signals are received, the third indicator means indicating one of the main-serial numbers and one of the model numbers on the third display means;

a selection station for selecting the first sub-assembly for the first model or the first sub-assembly for the second model, said selection station being located downstream of both said first and second sublines, said selection station selecting either said sub-assembly for said first model or said second model in accordance with the model number indicated on the third indicator means; and a first assembly line for finally assembling the selected sub-assembly, said first assembly line being located downstream of the selection station.

2. The vehicle assembling system of claim 1, wherein said first, second and third indicator means change the main-serial number and the model number displayed in accordance with an operation of the output switch means of said first, second and third indicator means, respectively.

3. A vehicle assembling system comprising:

a computer means including a means for outputting signals indicative of sub-serial numbers, main-serial numbers and model numbers, one of the main-serial numbers corresponding to one of the sub-serial numbers and one of the model numbers;

a first indicator means connected to said computer means, the first indicator means receiving said signals outputted from the computer means, the first indicator means including a memory, a first display means and an output switch means, the memory including a means for memorizing the signals from the computer means in an order in which the signals are received, the output switch means outputting the memorized signals from the first indicator means in accordance with the order in which the signals are received, the first indicator means indicating one of the main-serial numbers and one of the model numbers on the first display means;

a second indicator means connected to said computer means, the second indicator means receiving said signals from the computer means, the second indicator means including a memory, a second display means and an output switch means, the memory memorizing the signal from the computer means in the order in which the signals are received, the output switch means outputting the memorized signal from the second indicator means in the order in which the signals are received, the second indicator means indicating one of the main-serial numbers and one of the model numbers on the second display;

a first sub-assembly line for provisionally assembling a first sub-assembly for a first model, the first sub-assembly for the first model comprising a plurality of parts;

a second sub-assembly line for provisionally assembling a first sub-assembly for a second model, the first sub-assembly for the second model comprising a plurality of parts;

a first numbering means for numbering a first part of the first sub-assembly for the first model with the main-serial number indicated by the first indicator means and the corresponding sub-serial number, whereby when the first display means indicates both the main-serial number and the model number, the first numbering means numbers said first part with the indicated main-serial number and the corresponding sub-serial number;

a second numbering means for numbering a first part of the first sub-assembly for the second model with the main-serial number indicated by the second indicator means and the corresponding sub-serial number, the main-serial number of the second indicator means being different from the main-serial number of the first indicator means, whereby when the second indicator means indicates both the main-serial number and the model number, the second numbering means numbers the first part of the first sub-assembly of the second model with the indicated main-serial number and corresponding sub-serial number;

a third indicator means connected to the computer means, the third indicator means receiving said signals from the computer means, the third indicator means including a memory, a third display means and an output switch means, the memory memorizing the signals from the computer means in the order in which the signals are received, the output switch means outputting the memorized signals from the third indicator means in the order in which the signals are received, the third indicator means indicating one of the main-serial numbers and one of the model numbers on the third display means;

a selection station for selecting the sub-assembly for either the first or second model, said selection station being located downstream of both said first and second sublines, said selection station selecting either said sub-assembly for said first or second models in accordance with the model number indicated on the third indicator means; and a first assembly line for finally assembling the selected sub-assembly, said first assembly line being located downstream of the selection station.

a fourth indicator means connected to said computer means, said fourth indicator means receiving said signals from the computer means, the fourth indicator means including a memory, a fourth display means and an output switch means, the memory memorizing the signals from the computer means in the order in which the signals are received, the output switch means outputting the memorized signals from the fourth indicator means in the order in which the signals are received, the fourth indicator means indicating one of the main-serial numbers and one of the model numbers on the fourth display means;

a fifth indicator means connected to the computer means, the fifth indicator means receiving said signals from the computer means, the fifth indicator means including a memory, a fifth display means and an output switch means, said memory memorizing said signals from the computer means in the order in which said signals are received, the output switch means outputting the memorized signals from the fifth indicator means in the order in which the signals are received, the fifth indicator means indicating one of the main-serial numbers and one of the model numbers on the fifth display means;

a third sub-assembly line for provisionally assembling a second sub-assembly of a third model, the third sub-assembly comprising a plurality of parts;

a fourth sub-assembly line for provisionally assembling a second sub-assembly of a fourth model, the second sub-assembly comprising a plurality of parts;

a sixth indicator means connected to said computer means, the sixth indicator means receiving said signals from the computer means, the sixth indicator means including a memory, a sixth display means and an output switch means, the memory memorizing the signals from the computer means in the order in which the signals are received, the output switch means outputting the memorized signals from the sixth indicator means in the order in which the signals are received, the sixth indicator means indicating one of the main-serial numbers and one of the model numbers on the sixth display means;

a second selection station for selecting one of the second sub-assemblies of either the fourth or fifth models, said second selection station being located downstream of both the third and fourth sublines, said selected sub-assembly being selected in accordance with the model number indicated by the third indicator means;

a seventh indicator means connected to said computer means, said seventh indicator means receiving said signals from the computer means, the seventh indicator means including a memory, a seventh display means and an output switch means, the memory memorizing the signals from the computer means in the order in which the signals are received, the output switch means outputting the memorized signals from the seventh indicator means in the order in which the signals are received, the seventh indicator means indicating one of the main-serial numbers and one of the model numbers on the seventh display means; and an assembly station for assembling the first selected sub-assembly to the second selected sub-assembly, said assembly station being located downstream of both the first selection station and the second selection station, whereby either said first selected sub-assembly or said second selected sub-assembly is selected in accordance with the main-serial number indicated on the seventh indicator means.

4. The vehicle assembling system of claim 3, wherein the indicated main-serial and model numbers on the fourth display means coincide with the indicated main-serial and model numbers on the first display means, and the indicated main-serial and model numbers on the fifth display means coincide with the indicated main-serial and model numbers on the second display means.

5. A method for controlling a vehicle assembling system, comprising the steps of:

outputting signals from a computer means, said signals including sub-serial numbers, main-serial numbers and model numbers, at least one of the main-serial numbers corresponding to one of the sub-serial numbers and one of the model numbers;

indicating a first main-serial number and a first model number on a first indicator means in accordance with said signals received from said output of said computer means;

indicating a second main-serial number and a second model number on a second indicator means in accordance with receipt of the signals from the computer means;

numbering one part of a first sub-assembly of a first model with the main-serial number indicated on the first indicator means and the corresponding sub-serial number;

numbering one part of a first sub-assembly of a second model with the main-serial number indicated on the second indicator means and the corresponding sub-serial number;

provisionally assembling said first sub-assembly of said first model, said first sub-assembly comprising a plurality of parts;

provisionally assembling said first sub-assembly of said second model, said first sub-assembly comprising a plurality of parts;

indicating a third main-serial number and a third model number on a third indicator means in accordance with receipt of said signals from the computer means;

selecting one of the first assemblies of the first or second models from the first and second sub-assembly lines in accordance with the model number indicated on the third indicating means; and finally assembling the selected first sub assembly of the first model or the second model.

* * * * *